J. B. SCHUMAN.
SHOCK HANDLING ATTACHMENT FOR CORN HUSKING AND SHREDDING MACHINES.
APPLICATION FILED JAN. 30, 1914.
1,205,670.
Patented Nov. 21, 1916.
5 SHEETS—SHEET 1.
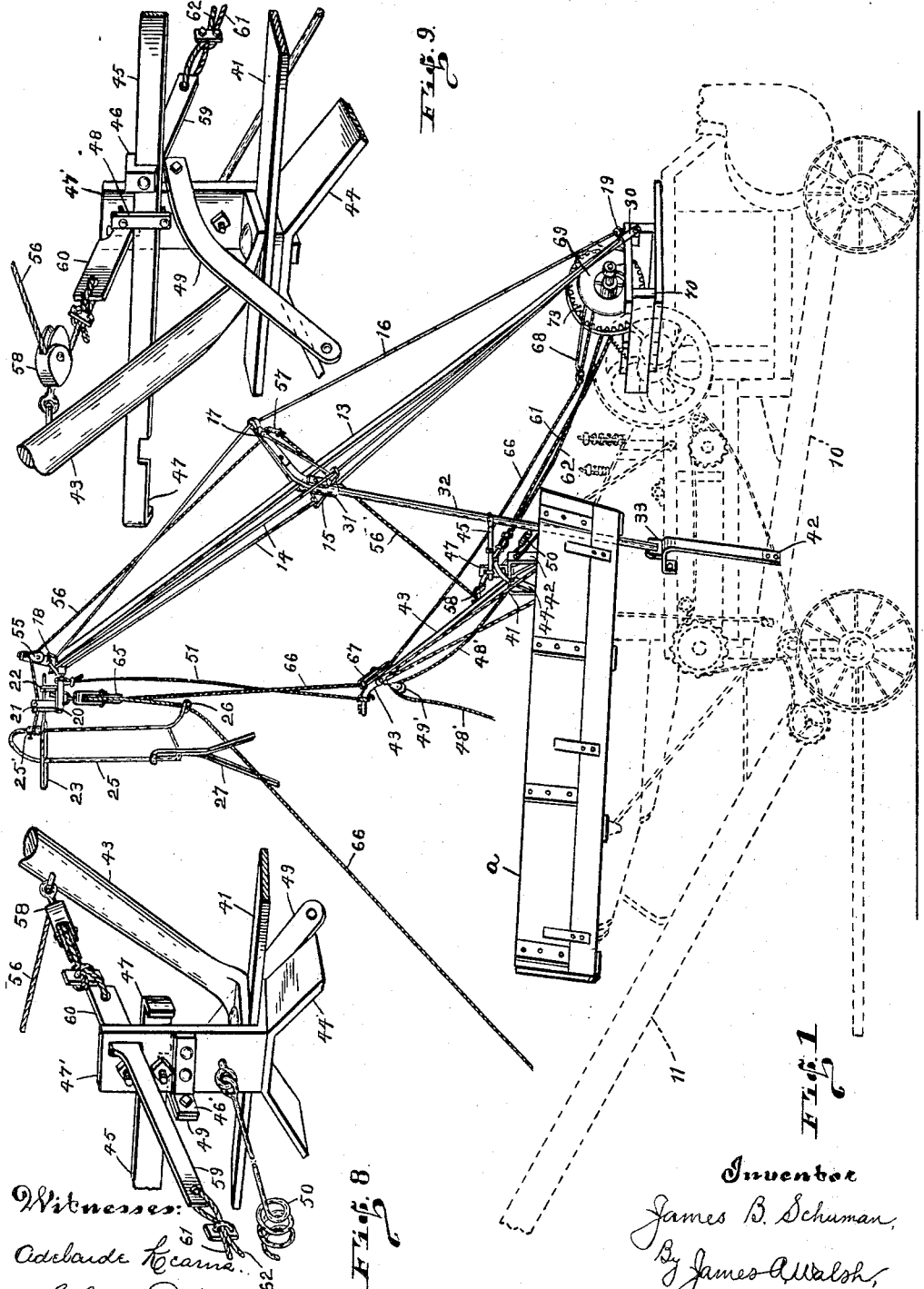
Inventor
James B. Schuman,
By James A. Walsh,
Attorney
Witnesses:
Adelaide Kearns
Clara Dilks

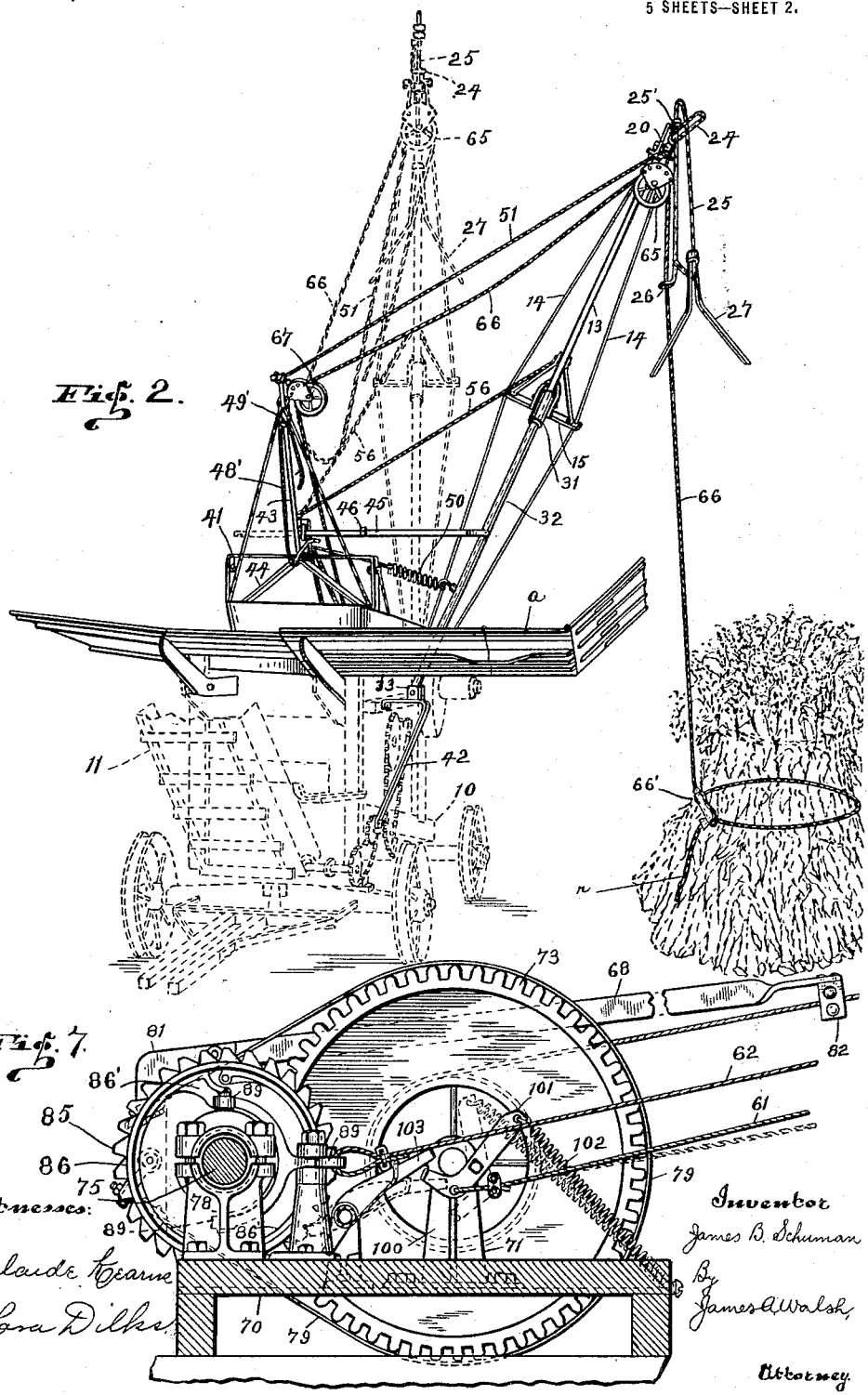

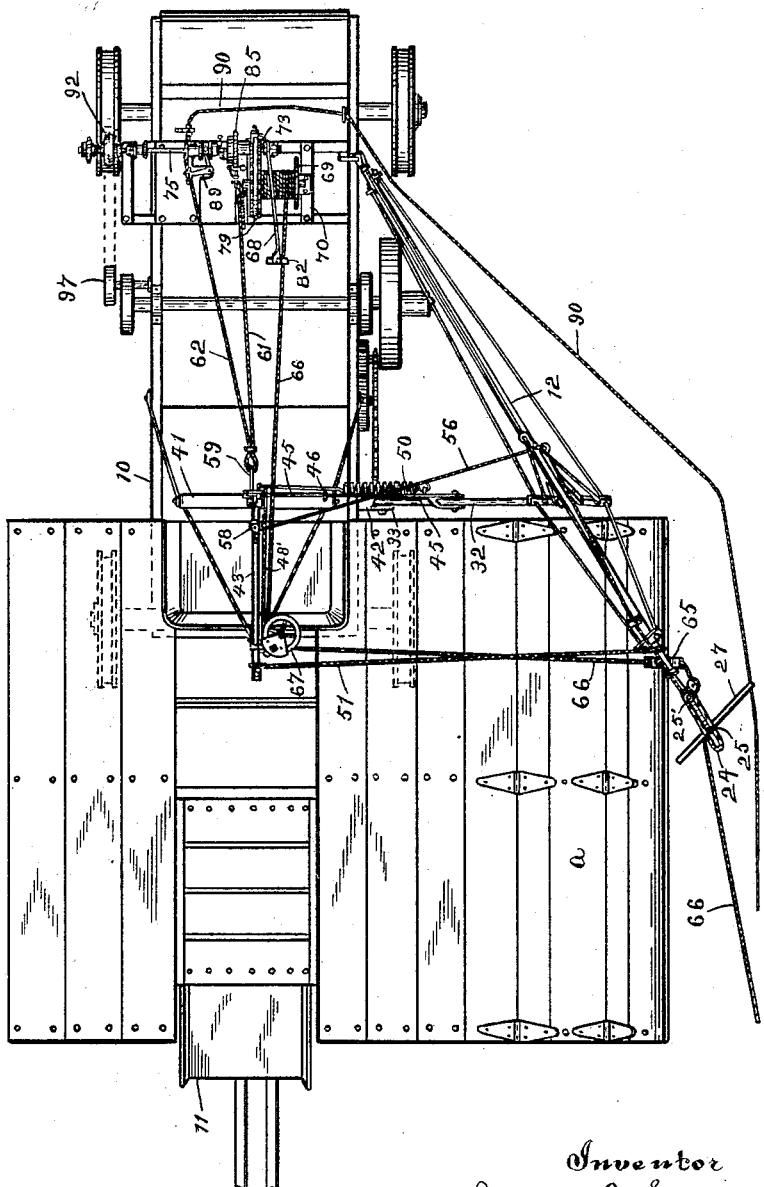

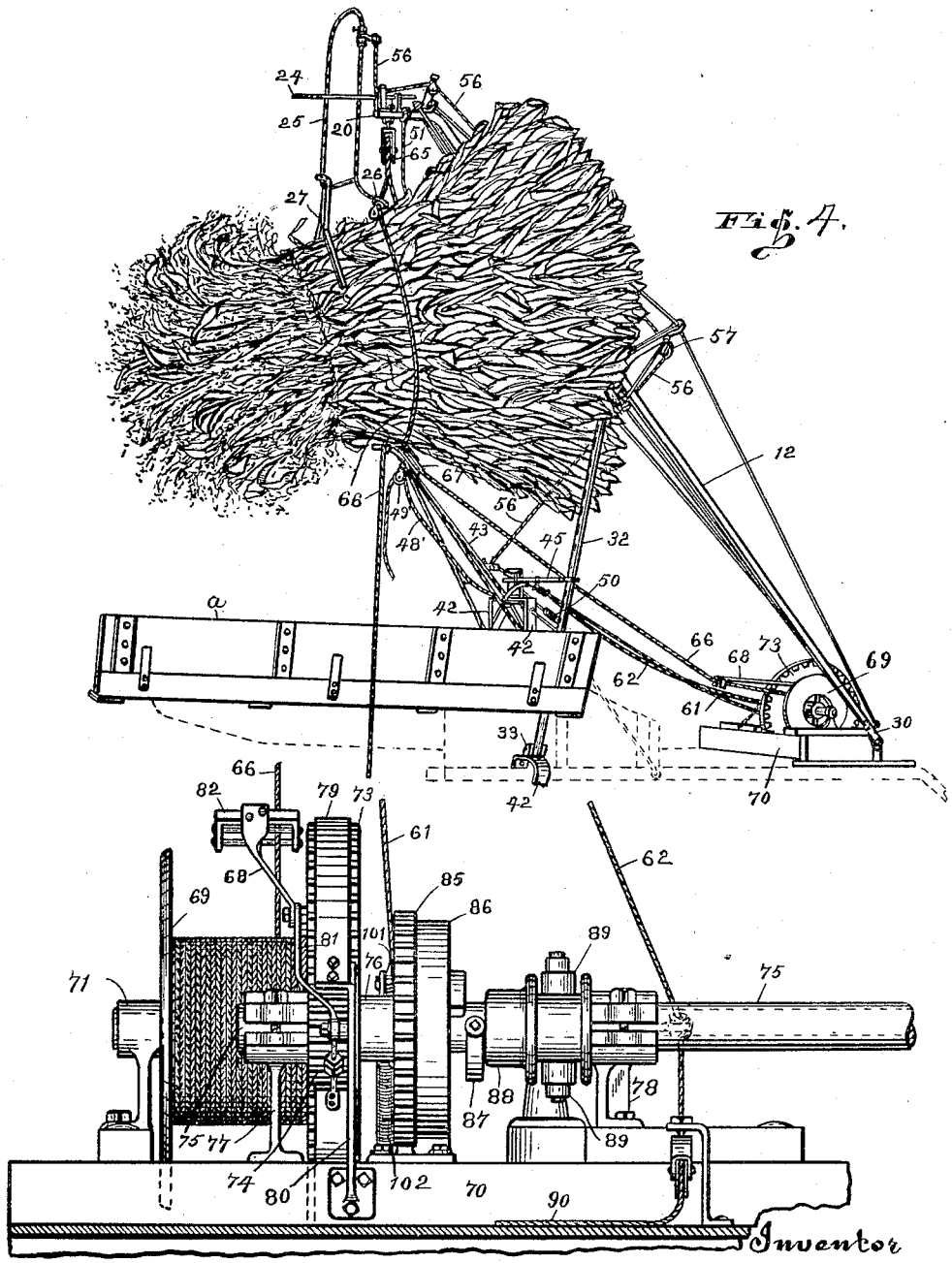

J. B. SCHUMAN.
SHOCK HANDLING ATTACHMENT FOR CORN HUSKING AND SHREDDING MACHINES.
APPLICATION FILED JAN. 30, 1914.
1,205,670.
Patented Nov. 21, 1916.
5 SHEETS—SHEET 5.
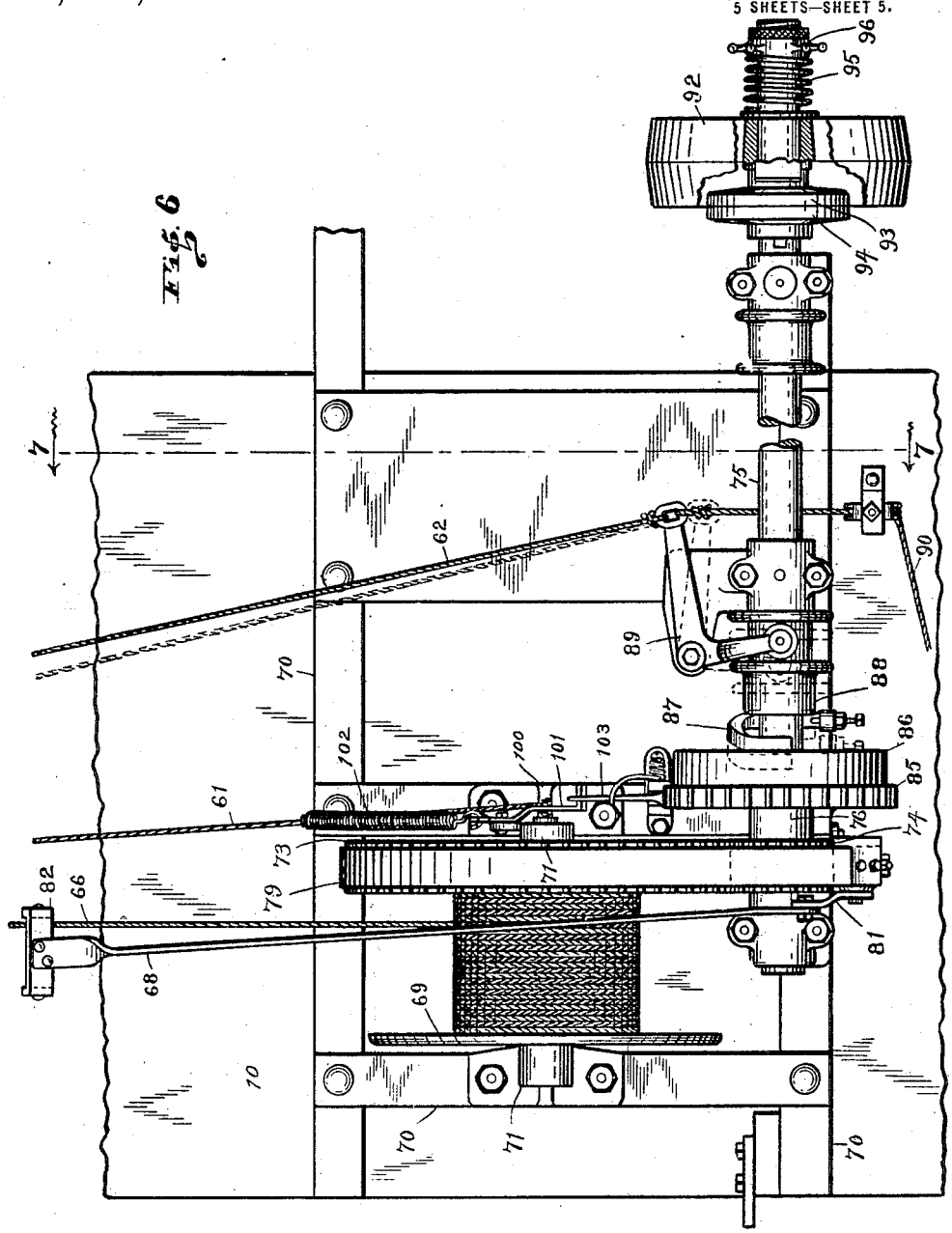

UNITED STATES PATENT OFFICE.

JAMES B. SCHUMAN, OF INDIANAPOLIS, INDIANA, ASSIGNOR TO THE SCHUMAN COMPANY, OF INDIANAPOLIS, INDIANA, A CORPORATION OF MAINE.

SHOCK-HANDLING ATTACHMENT FOR CORN HUSKING AND SHREDDING MACHINES.

1,205,670.  Specification of Letters Patent.  Patented Nov. 21, 1916.

Application filed January 30, 1914. Serial No. 815,534.

*To all whom it may concern:*

Be it known that I, JAMES B. SCHUMAN, a citizen of the United States, residing at Indianapolis, in the county of Marion and State of Indiana, have invented certain new and useful Improvements in Shock-Handling Attachments for Corn Husking and Shredding Machines, of which the following is a specification.

My invention relates to improvements in shock handling attachments for corn husking and shredding machines of substantially that character which is the subject of Letters Patent No. 990,785, issued April 25, 1911, upon my application, and designed to draw complete corn shocks to a shredder, elevate, and deposit the same upon a feeding table in a desirable and convenient position to be fed into the shredder. Said improvements are so associated therewith as to enable the operators to handle shocks deposited at either side of the machine. As is well known, the customary manner, generally, of supplying fodder to such shredders, is to tear the corn shocks apart in the field, manually load the fodder upon wagons, transport the same to where the shredder is located, and then manually unload the loose fodder in small portions upon the feed table of the shredder. This labor requires the employment of several wagons and teams and a corresponding complement of men to at all times keep the shredder supplied with material, and is necessarily slow, tedious and expensive.

As disclosed by Patent No. 983,774, for a corn shock loader and unloader, issued February 7, 1911, it is now possible to readily transport corn shocks as units from the field and deposit them in standing position in proximity to a shredder; and it is my present object to provide mechanisms in connection with shredders by which such shocks by power can be delivered onto a shredder in position to be fed into the rolls, and with which in connection with the shock loader and unloader referred to I render it possible for two men operating a shredder of average capacity to accomplish the work of readily removing the corn crop from the field and shredding the same, thus expeditiously and economically performing work which heretofore has required a large number of men and teams.

My improvement contemplates interchangeable mechanisms which may be readily placed at either side of the shredder to avoid obstacles which at times exist at the place of shredding, it is comparatively inexpensive to manufacture, and readily operable by the power which operates the shredder.

In the accompanying drawings, which are made a part hereof, Figure 1 is a side elevation of a shredder, in dotted lines, showing my improved hoisting arrangement in full lines; Fig. 2 a perspective of the machinery showing a shock in the act of being drawn up to be deposited upon the feed table; Fig. 3 a plan showing my improvement applied to a shredder; Fig. 4 a fragmentary side elevation showing a corn shock in position to be deposited upon a feed table; Fig. 5 a rear elevation of the winding mechanism which I employ; Fig. 6 a plan thereof; Fig. 7 an end elevation of that portion of my improvement by which the lifting cables and other associated mechanisms are controlled, as seen when looking in the direction indicated by the arrows 7—7 in Fig. 6; and Figs. 8 and 9 are perspective views of portions of my improvements.

In said drawings the portions marked 10 indicate the husking and shredding machine, (herein referred to as a shredder), 11 being the usual ear-corn conveyer, and *a* indicates a hinged feed table from which the material is fed to the shredder. Upon said shredder, preferably at one side thereof, I mount a boom, 12, comprising specifically, as shown most plainly in Figs. 1 and 2, a main bar, 13, and truss rods, 14, secured in a cross member, 15, and a truss rod, 16, secured in a substantially upright member, 17, which truss rods are suitably secured by stays, 18, 19, at their upper and lower ends, and may be increased in number and differently disposed in order to make the structure as a whole secure for the purpose designed, as will be readily understood. The outer end of said main bar 13 preferably terminates horizontally and forms a support, 20, for mechanisms hereinafter to be referred to. Said support 20 is provided with bearings, 21, 22, in which is mounted a guide, 23, the outer portion of which is formed into a loop, 24, Fig. 2. In said loop 24 is a movable trip, 25, comprising a frame (Fig. 1), having a cable guide, 26, preferably at one end, and a bifurcated member, 27, adapted to slide vertically on said frame, the latter being provided with a collar, 25', to permit its adjustment in loop 24. The bar 13, at 30 (Fig. 4), is pivotally secured to the shredder frame, the member 15 being preferably formed with a socket, 31, which fits onto a standard, 32, the latter being pivotally secured, at 33, to the shredder and which pivotal mounting permits said boom 12, to swing outwardly from the shredder and downwardly, and upwardly and inwardly thereover, as indicated in full and dotted lines in Fig. 2.

On the deck of the shredder 10 I place a frame of any desired form for my purpose, that shown comprising preferably a horizontally arranged base, 41, having legs, 42, which are secured to the sides of the shredder, and secured to said base is an arm, 43, which base is braced by the rods, 44. Said standard 32 and frame are connected by a slidable bar, 45, having a stop, 46, and a notched end, 47, the latter being designed to engage in a catch, 48, supported in an upright, 47', and to be disengaged from said catch by a lever, 49, controlled by a rope, 48', running over pulley, 49', said lever being pivoted to an ear, 46', mounted on upright 47'. A spring, 50, also connects said frame and the standard 32, and a cable, 51, connects the upper end of the boom 12 with said arm 43, all as plainly shown in Figs. 1 and 2. At the upper end of said boom 12, is a pulley, 55, from which and through bearing 21 passes a cable, 56, connected to trip 25, and which cable is further supported in a pulley, 57, on the boom and in a pulley, 58, mounted on the arm 43 and communicates with a locking bar, 59, having an enlarged portion, 60. Secured to the opposite end of said bar 59 are trip ropes 61, 62, which communicate with the winding mechanism (Fig. 3) at the rear of the shredder, hereinafter to be more particularly described. A pulley, 65, is suspended from said support 20, which, in connection with cable guide 26, supports a cable, 66, the outer end of which encircles a shock and the opposite portion of which passes over pulley, 67, through a brake lever, 68, and around a winding drum, 69.

At the rear of the shredder I place a frame, 70, on which is mounted in suitable bearings, 71, the winding drum 69, comprising a gear wheel, 73, said gear wheel meshing with a pinion, 74, mounted on shaft, 75, by a sleeve, 76, said shaft being supported in suitable bearings, 77, 78, Fig. 5. Surrounding said wheel and pinion is a brake strap, 79, secured at one end to a support, 80, and its opposite end is attached to an arm, 81, pivotally mounted in said support 80 as indicated, said arm having the extension 68, constituting a brake lever and provided with a cable guide, 82, at its outer end. Also mounted on shaft 75 is a ratchet wheel, 85, comprising a band, 86, containing an expansion clutch, 86', with which an expansion lever, 87, communicates and is designed to be engaged and disengaged from said clutch through a cone or collar, 88, and bell-crank lever, 89, controlled by trip ropes 62 and 90, all as indicated in Fig. 6. The driven end of said shaft 75 is provided with a friction clutch pulley, 92, comprising the members, 93, 94, the degree of friction between said members being controlled by the tension spring, 95, which latter is regulated by the adjusting nut, 96. Said pulley 92 is preferably driven from a pulley, 97, on the shredder, or from any other suitable source of power. Pivotally mounted on standard, 100, adjacent gear wheel 73, is a dog, 101, controlled by a spring, 102, communicating with one end thereof and the frame 70, said dog being designed to contact with a preferably spring mounted pawl, 103, to disengage the latter from ratchet wheel 85 for a purpose hereinafter to be explained.

In the operation of a shredder in connection with my improvements it will be understood that the corn shocks have been or are being deposited in standing position upon the ground in proximity to the shredder and at varying distances therefrom, according to the yard space available, but usually any distance up to about two hundred and fifty feet from the shredder is practical. When it is desired to place a shock upon the feed table, the boom 12 being in the position shown in full lines (Fig. 2), an operator on the ground seizes the end of cable 66 and draws it to and encircles it about a shock, tightening the same with any suitable releasing grapple, as 66'. When the shock has been grappled, the operator pulls trip rope 90 which extends along the ground within convenient reach, which rope actuates bell-crank lever 89 and collar 88 to engage expansion lever 87 with clutch 86' which causes ratchet 85 and pinion 74 to rotate, the drum 69 being driven by said pinion to wind up cable 66, which cable draws the shock upwardly until it contacts with bifurcated member 27 of trip 25. At this moment the ascending shock forces trip 25 upward, Fig. 4, which movement pulls cable 56 upwardly which in turn draws locking bar 59 into the position indicated in Fig. 9. This movement of the cable 56 actuates rope 62 to switch bell-crank lever 89 to the position shown in full lines, Fig. 6, thus disengaging expansion lever 87 from contact with collar 88 and releases clutch 86'. Instantly this operation takes place, the movement of said cable 56 actuates rope 61 to withdraw dog 101 from contact with pawl 103, which latter being spring mounted automatically engages ratchet wheel 85 preventing the same from rotating, and consequently drum 69 and pinion 74 which communicates with said ratchet wheel by sleeve 76.

Cable 56 and the mechanisms communicating therewith are maintained in the condition just described by the pawl 103, the dog 101 controlling said pawl, being maintained out of contact therewith by the bar 59, the enlarged portion 60 thereof engaging with the upright 47' preventing spring 102 from returning said dog to operative position. The shock is now suspended in line with the outer edge of the feed table $a$, ready to be swung in and be deposited upon said table, which operation is controlled by the feeder, who, when desiring material, pulls rope 48' which actuates lever 49 to lift the notched end 47 of bar 45 out of engagement with catch 48, at which operation the shock, by gravity, assisted by spring 50, swings the boom into substantially vertical position, as shown by dotted lines, Fig. 2, carrying the trip bar in with it until the stop 46 contacts with the upright 47'. The shock remains suspended ready to be deposited upon the feed table, which is accomplished by the operator on the ground who pulls the trip, $r$, releasing the grapple binding the shock which permits the stalks to fall in horizontal position, butt ends toward the shredder rolls. The operator then proceeds to handle another shock, pulling trip $r$ outwardly, and consequently the boom 12, through cable 66, until the notched end of bar 45 engages catch 48, at which moment said notched end drops slightly which permits the enlarged portion 60 of bar 59 to drop, and, when bar 59 is so released, the spring 102, Fig. 7, returns dog 101 to the position shown in full lines, contacting it with pawl 103 to disengage it from ratchet 85, which action of said spring on said dog also returns cable 56 to its original position, as shown in Fig. 1. While the operator is thus returning for another shock, drawing cable 66 with him, the latter is prevented from unwinding too rapidly from drum 69, as said cable passes through brake lever 68, which latter, through brake strap 79, retards the rotation of drum 69. When the shock is encircled, the winding mechanism is again set in motion by pulling trip rope 90, and the operations are repeated as hereinbefore described. Should the shock, on its way to the feed table, be obstructed and checked, or the upward travel of the cable 66 be checked, I provide against accident or breakage of the mechanisms by employing the friction pulley 92, so that when any undue strain occurs said pulley will act as an idler and shaft 75 will then cease rotating until conditions are again normal.

As indicated in Fig. 4, when the shock has reached its limit of upward movement, it is in horizontal position and becomes nested in bifurcated member 27 which steadies the shock and prevents it from being twisted about by the wind or otherwise.

By pivotally mounting the lower end of the boom, substantially as indicated, and seating the same upon standard 32, Fig. 1, I am enabled to readily remove the boom from said standard and lower the same upon the shredder when moving from one job to another, and, where conditions are such as to interfere with handling shocks from one side of the machinery, the boom may be readily transferred to the opposite side, together with standard 32, and the parts secured in position by their pivotal mountings, the trip bar 45 being reversed and fitted into its supporting frame to operate as before, which arrangements, as will be readily understood, render the parts interchangeable, as desired. Under some conditions, however, as where a shredder of extremely large capacity may be employed and it is desired to handle shocks from both sides thereof, the boom and mechanisms associated therewith may be duplicated and one set applied to each side of the shredder without material change in the arrangement or principles described.

I claim as my invention:

1. The combination, in a shock handling mechanism, of a trussed boom arranged in inclined position and pivotally mounted at its lower end and designed to swing outwardly from a shredder to elevate a shock and inwardly to deposit a shock thereon, a frame upon said shredder to which said boom is flexibly connected, and a trip bar communicating with said frame and boom for controlling the movements of said boom.

2. The combination, in a shock handling mechanism, of a boom arranged in inclined position pivotally mounted at its lower end and designed to swing outwardly from a shredder to elevate a shock and inwardly to deposit a shock thereon, a frame upon said shredder to which said boom is flexibly connected, a trip bar engaging said frame to maintain said boom in its outermost position, and means for disengaging said bar to permit the same and said boom to travel inwardly over said shredder.

3. Shock handling mechanism, comprising a boom arranged in inclined position pivotally mounted at its lower end and designed to swing outwardly from a shredder to elevate a shock and inwardly to deposit a shock thereon, a frame upon said shredder, means connecting said frame and the upper end of said boom, a trip bar communicating with said frame and boom for limiting the movement of said boom, and a spring connecting said frame and boom to draw the latter toward said frame when said trip bar is disengaged from said frame.

4. Shock handling mechanism, comprising a boom composed of a trussed structure arranged in inclined position, means for elevating a shock to said boom, means for tripping said boom to permit the same with its shock to swing inwardly over a platform, means for limiting the movement of said elevating means to maintain said shock in suspended position, means for releasing said elevating means to permit the deposit of said shock upon said platform, and means for limiting the outward movement of said boom.

5. Shock handling mechanism, comprising a boom composed of a trussed structure arranged in inclined position, a trip mounted on said boom, a shock lifting cable supported in said trip and boom, winding mechanism for said cable, a cable communicating with said trip and said winding mechanism, means for actuating said mechanism to wind said lifting cable and elevate said shock to contact with said trip and the latter to actuate said trip cable to throw said winding mechanism out of rotary motion and to so maintain the same until said shock has been released and said boom returned outwardly for another shock.

6. Shock handling mechanism, comprising a pivotally mounted boom arranged in inclined position, a winding mechanism embodying a drum associated with said boom, a shock lifting cable communicating with said drum and said boom, means for actuating said winding mechanism to wind one end of said cable about said drum, the other end of said cable being arranged to encircle and draw a shock upwardly to said boom, a trip on said boom against which said shock contacts, a trip cable secured to said trip and adapted to be drawn when said trip ascends by contact with said shock, means communicating with said trip cable and said actuating means whereby when said trip cable is drawn said actuating means is disengaged from said winding mechanism, other means communicating with said trip cable and said winding mechanism whereby when said trip cable is drawn as stated said winding mechanism becomes locked against rotation and said lifting cable thus held stationary to suspend a shock, and means intermediate said trip cable and said locking means for maintaining said winding mechanism in locked position.

7. Shock handling mechanism, comprising a boom composed of a trussed structure arranged in inclined position, means associated with said boom for lifting a corn shock, winding mechanism with which said lifting means communicates, means for shifting said boom when said shock is elevated, means communicating with said boom and said winding mechanism for stopping the rotation of the latter when said shock has been elevated and suspended, means for locking said winding mechanism against rotation, and means for maintaining said locking means in engagement with said winding mechanism until said shock has been released from said lifting cable.

8. In shock handling mechanism, the combination of a trussed boom, a frame adjacent thereto, a shifting member communicating with said boom and frame and arranged to limit the movement of said boom toward and from said frame, winding mechanism, a lifting cable supported on said boom and communicating with said winding mechanism, a trip cable supported on said boom and communicating with said winding mechanism for preventing the rotation thereof when said lifting cable has been sufficiently wound to elevate a shock, and means associated with said trip cable for maintaining said winding mechanism in non-rotating position until said shock has been released from said lifting cable.

9. In shock handling mechanism, a boom, comprising a trussed structure arranged in inclined position and adapted to swing as a whole, a lifting cable mounted thereon, a frame, a shifting member communicating with said frame and said boom, means associated with said frame for engaging said shifting member to limit the movement of said boom, and means for releasing said member from said engaging means to permit said boom to move away from said frame.

10. In shock handling mechanism, a boom, a lifting cable supported on said boom, a trip communicating with said boom and with which said cable is associated, and means associated with said trip for preventing a corn shock from twisting.

11. In shock handling mechanism, a trip comprising a frame embodying means for guiding a shock lifting cable, and means associated with said trip for preventing a corn shock from twisting.

12. In shock handling mechanism, a boom pivotally mounted and arranged in inclined position, winding mechanism, a shock lifting cable communicating with said boom and said winding mechanism, a trip cable communicating with said boom and said winding mechanism to stop the latter from rotating, and means associated with said trip cable for maintaining said winding mechanism in such condition until a shock has been released from said lifting cable.

13. In shock handling mechanism, a boom pivotally mounted and arranged in inclined position, a shock lifting cable supported thereon, winding mechanism with which said cable communicates and by which it is drawn upwardly to elevate a shock, means for stopping said winding mechanism when a shock has been elevated to and suspended from said boom, and means for preventing said winding mechanism from operating when the upward movement of said cable becomes checked.

14. In shock handling mechanism, a boom pivotally mounted and arranged in inclined position, a winding mechanism, a shock lifting cable communicating with said boom and said winding mechanism by which a shock is drawn to and suspended from said boom, a trip communicating with said boom and said winding mechanism by which said mechanism is stopped from rotation when said shock has been suspended, means for maintaining said trip in said position until said shock has been released from said lifting cable, and means for releasing said trip to permit said winding mechanism to rotate when it is desired to elevate another shock.

15. In shock handling mechanism, a pivotally mounted boom arranged in inclined position, winding mechanism, a shock lifting cable communicating therewith and with said boom, means engaging said winding mechanism for preventing the same from winding said cable after it has suspended a corn shock, means for maintaining said engaging means in position until a shock has been released from said cable, means for removing said engaging means from said winding mechanism to permit said cable to be unwound when drawn to a shock, and means under control of an operator for actuating said winding mechanism to wind said cable and elevate a shock.

In testimony whereof I affix my signature in presence of two witnesses.

JAMES B. SCHUMAN.

Witnesses:
C. D. MORRISON,
LEE R. GARBER.

Copies of this patent may be obtained for five cents each, by addressing the "Commissioner of Patents, Washington, D C."